United States Patent [19]

Conrad

[11] Patent Number: 5,132,939
[45] Date of Patent: Jul. 21, 1992

[54] LOW TRANSIENT SWITCHING SYSTEM

[75] Inventor: Richard J. Conrad, Hamilton, Mass.

[73] Assignee: Hewlett-Packard Company, Palo Alto, Calif.

[21] Appl. No.: 705,192

[22] Filed: May 24, 1991

[51] Int. Cl.⁵ .............................................. G03B 42/06
[52] U.S. Cl. ...................................... 367/105; 367/7
[58] Field of Search ...................... 367/105, 7; 73/626

[56] References Cited

U.S. PATENT DOCUMENTS 4,218,768 8/1980 Hassler ................................ 367/105

Primary Examiner—Daniel T. Pihulic

[57] ABSTRACT

This invention relates to low transient switching apparatus, and more particularly to switching arrays of low transient switching circuits which are adapted for use to substantially continuously focus transducer channel outputs in an ultrasonic scanning system. A separate switching array is provided for each channel. Each array has a switching circuit with an output for each focusing delay line tap to which a signal on the channel may be applied. Each switching circuit provides a substantially constant D.C. current output regardless of the state of the circuit. Array outputs for each delay line tap are summed, and the summed outputs are applied as the input to the tap. The DC current inputs to all taps are maintained substantially equal, preferably at zero DC current.

28 Claims, 4 Drawing Sheets

LOW TRANSIENT SWITCHING SYSTEM

FIELD OF THE INVENTION

This invention relates to low transient switching systems and more particularly to switching arrays of low transient switching circuits which are adapted for use to dynamically focus transducer channel outputs in an ultrasonic scanning system and to the balancing of DC currents in delay lines used in such scanning systems.

BACKGROUND OF THE INVENTION

A common problem in switching circuits for AC signals is switching transients which occur as a result of changes in the average DC current level at the switch output. Such transients can cause output errors in precision applications and, in particular, can cause artifacts (i.e. undesired images) when the switch is being used as part of a display control apparatus.

One application where this problem arises is in phased array ultrasonic imaging systems where an image is generated of, for example, portions of a patient's body through which an ultrasonic beam is passing at successive time intervals. In such a system, a number of elements of a transducer array are utilized to perform a particular scan at a particular angle and/or to focus the ultrasonic beam. For example, with a transducer array having 128 or 256 transducer elements, as few as two such elements might be utilized for a given window. The number of transducer elements utilized may be expanded as a function of depth or for different applications, with all transducers in the array being sometimes utilized.

Since in such systems, the distance from each of the transducer elements to the point in the body being scanned varies with scan depth, the received ultrasound signals are normally passed through a multi-tap delay line in order to cause all signals received from a given point to be outputted from the delay line at the same time. This will sometimes be referred to hereinafter as "focusing" the transducer beam.

However, since the difference in distance between targets of interest and various transducer elements vary with depth, the delay line can only be focused for a given depth. This problem can be dealt with by switching taps on the delay line in an attempt to maintain the beam in focus at successively greater depths. However, such switching of taps causes transients which result in undesired artifacts in the resulting image.

DC currents flowing in the delay line as a result of differences in the average DC current at various delay line taps can also cause distortion errors in the delay line. Therefore, it is preferable that the DC current at all taps of the delay line be balanced so no net DC current flows in the delay line. Ideally, the DC current at all of the taps is substantially zero.

Currently, switching artifacts are avoided by switching only at dead times between received signals or employing parallel processing and line splicing techniques. However, this is difficult to do with high speed systems and generally results in only one or two switchings during a given scan line. This means that the beam is generally only approximately in focus and thus results in reduced image quality. It would be preferable if the switching could occur more frequently so as to permit nearly continuous focusing of the beam and thus enhanced image quality, while keeping artifacts below the level at which display occurs. For a typical ultrasonic scan display, this would be 60 db below full white or maximum signal level. Distortion caused by DC currents flowing in the delay line are not currently dealt with.

SUMMARY OF THE INVENTION

It is, therefore, an object of this invention to provide a switching circuit with improved switching transient characteristics such that any switching transients are 60 db below the normal maximum signal level.

More particularly, it is an object of this invention to provide switching circuits for use in an ultrasonic scanning system which permit nearly continuous focusing during ultrasonic scan lines without introducing transient artifacts.

Another object of the invention is to substantially equalize the DC currents at the delay line taps so that distortion causing DC currents do not flow in the delay line.

In accordance with the above, this invention provides a low transient apparatus for nearly continuous focusing of an ultrasonic transducer scanning system by selectively controlling delay line taps to which transducer element output signals are applied. A switching array is provided for each channel of the ultrasonic transducer array. The output from an element of the transducer is applied to a corresponding channel switching array. The outputs from the switching array are connected to taps on the delay line. A switch circuit is provided in the switching array for each array output. Each of the switch circuits provides a substantially constant DC current output regardless of the state of the switch circuit. The array outputs for each given delay line tap are summed and the summed outputs applied as the input to the tap. The state of each switch circuit of each array is controlled by suitable switch inputs applied thereto.

Each of the switch circuits has at least two states, the switch circuit providing a predetermined DC current to the corresponding array output when in a first state and providing the same predetermined DC current to the array output with the AC input for the array channel superimposed thereon when in the other state. Since the DC current at each switch output remains constant, switching transients at the outputs are minimized.

For preferred embodiments of the invention, the DC currents at the delay line taps are substantially equal so that DC current does not flow in the delay line. The DC currents at the delay line taps are preferably zero. This objective may be achieved in a variety of ways, including (a) causing each circuit to generate an output having zero DC current; (b) balancing the DC current at each switch circuit output with an equal but opposite DC current; and (c) balancing the summed DC current outputs from corresponding switch circuits in each array which are applied to each tap with a DC current equal and opposite to the summed DC currents.

For an embodiment of the invention utilizing approach (a) above, the DC current at each switch output is substantially zero. For this embodiment, when the switch circuit is in a first state, no DC current is present at the switch circuit output. When the switch circuit is in its second state, substantially like DC currents are applied to the switch circuit output with an AC current representative of the array input signal being superimposed on at least one of the applied DC currents, resulting once more in no DC current being present at the switch circuit output.

For another embodiment of the invention, there are first and second substantially like DC current sources. One of the DC currents has an AC current representative of the array input signal superimposed thereon (the "superimposed current source"). Each switch circuit includes a first transistor or other switching element for applying the superimposed current to the circuit output when the circuit is in one of its states and a second transistor or other switching element for applying the other DC current to the circuit output when the circuit is in its second state. A non-superimposed current source is utilized for each switch circuit of a given switch array. A superimposed current source may also be provided for each switch current or a single superimposed current source may be utilized for all switch circuits of an array.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
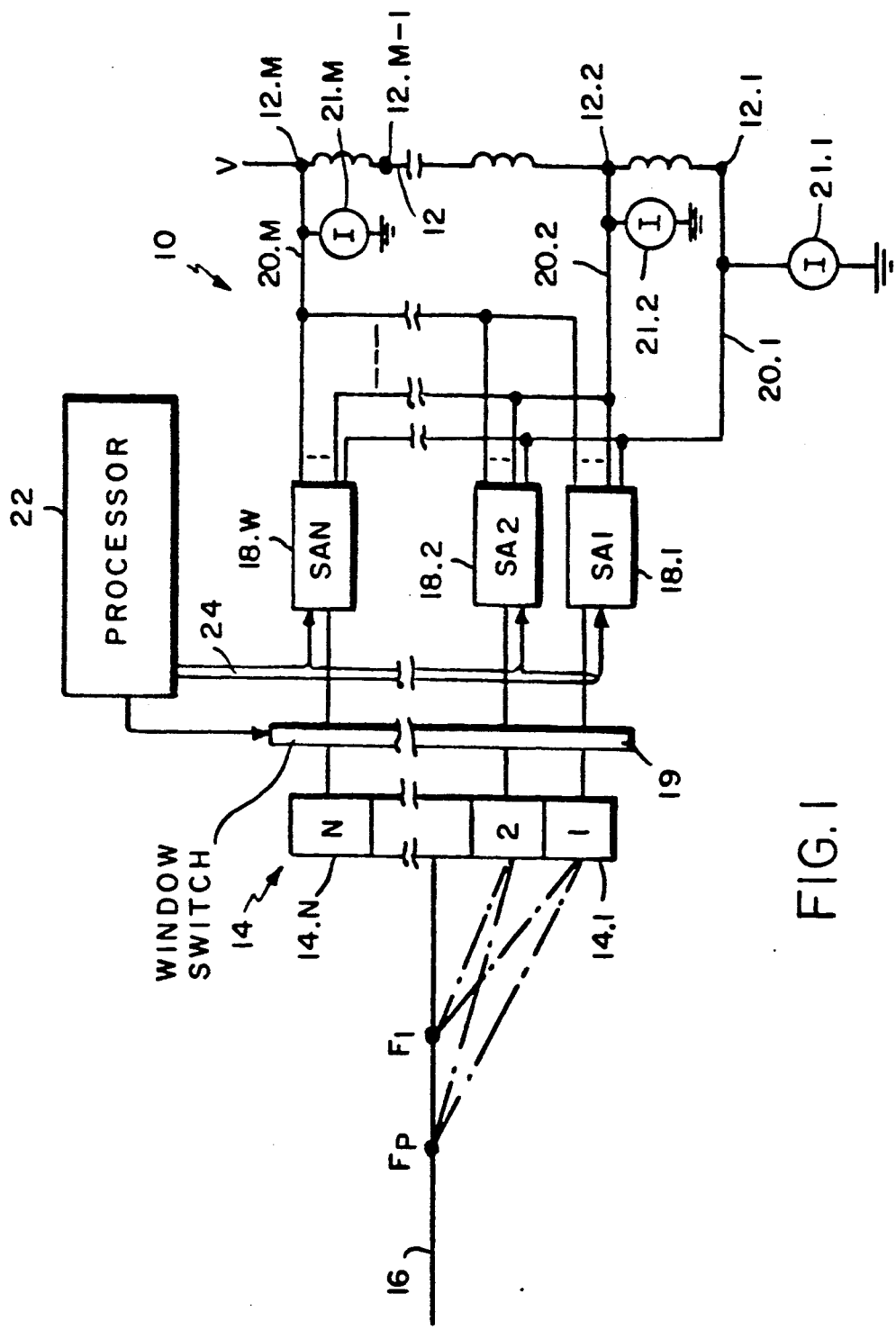
FIG. 1 is a semi-block diagram of a system incorporating the teachings of this invention.

FIG. 1 shows the portion of an ultrasonic scanning system 10 incorporating the teachings of this invention up to and including a standard focusing delay line 12. The remainder of the ultrasonic scanning system beyond the delay line 12 is standard and does not form part of the present invention. Delay line 12 has a plurality of delay line taps 12.1, 12.2, ... 12.M. For a typical system, M might be thirty two.

The system 10 has an ultrasonic transducer 14 with a plurality of transducer elements 14.1-14.N. N may have a typical range of 2 to 256. For a given scan, a subset or window of the transducer elements 14.1.-14.N would typically be utilized, which window might contain as few as one or two of the transducer elements up to the full number of elements in the transducer array.

When transducer elements are being utilized to scan along a line at a given direction or angle, for example the line 16 shown in FIG. 1, the distance from each transducer element to a focal point F1, F2 ... FP on the line varies as the depth of the focal point along the line 16 increases. Delay line 12 can compensate for the differences in distance at any given focal point, but the tap to which the output from a given transducer element is applied on delay line 12 must be varied in order to maintain the beam in focus along the line 16 for the different focal points F therealong.

In order to accomplish this objective, the output from each transducer element 14 is applied to a window switch 19. Window switch 19 has an output for each channel W of a scanning window being employed, each output being connected as the input to a corresponding switch array 18.1, 18.2 ... 18.W. For systems where the window may include all the transducer elements 14, so that W may equal N under some conditions, window switch 19 would not be required, each element 14 being connected directly to a corresponding switch array 18. Typically, such a system would be one utilizing a expanding window/aperture with depth, W=N only at very deep depths.

In FIG. 1, each switching array 18 is shown as having M outputs 20.1-20.M, one for each delay line tap 12.1-12.M. However, this is by no means a limitation on the invention. For example, in some applications, the output from transducer element 14.1 might never be applied to tap 12.M. Therefore, if array 18.1 were being used only for transducer element 14.1, it need not have an output for tap 12.M. Thus, each switching array 18 would have a plurality of outputs corresponding to the taps to which an output from a corresponding transducer element 14 connected thereto might be applied. The corresponding output lines 20 from each switching array (for example, the line 20.1 from each array 18.1-18.M) are connected together as the input to the corresponding tap. Thus, the outputs for a given tap from the various switching arrays are summed on the lines 20 and the summed analog signals are applied to the corresponding tap of delay line 12.

In addition to the outputs from the arrays 18.1-18.W, each summing line also has an input from a corresponding DC current source 21.1-21.M. Current sources 21 each provide a DC current which is preferably equal in value but opposite in polarity to the summed DC currents on the corresponding line 20 from arrays 18. Proper DC current values for current sources 21 may be determined from circuit parameters and may, if necessary, be fine tuned empirically. DC current sources 21 result in substantially zero DC current appearing at each delay line tap 12.1-12.M, and thus in reduced delay errors caused by DC currents flowing in the delay lines. To the extent the current from a DC current source 21 is not equal to the summed DC current, so long as this current is of opposite polarity and of reasonably close value to the summed DC current, some reduction in delay line error will occur and is highly dependent on the delay line construction.

A processor 22 is provided having switch output lines 24 which are applied as inputs to each of the switching arrays 18. There would be at least one output line 24 for each switch circuit in each switch array 18. As will be discussed later, there is a switch circuit in each switch array 18 for each output line 20 therefrom. Processor 22, which is also shown as controlling window switch 19, could be a special purpose processor programmed to perform the switch control signal generation function, or could be the processor utilized for the ultrasonic scanning control which is also programmed to perform the switch signal generation function. However, in order to achieve desired speeds of operation, it is preferable that processor 22 be a special purpose processing apparatus which is designed and programmed to generate switch control signals.

Figure 2:
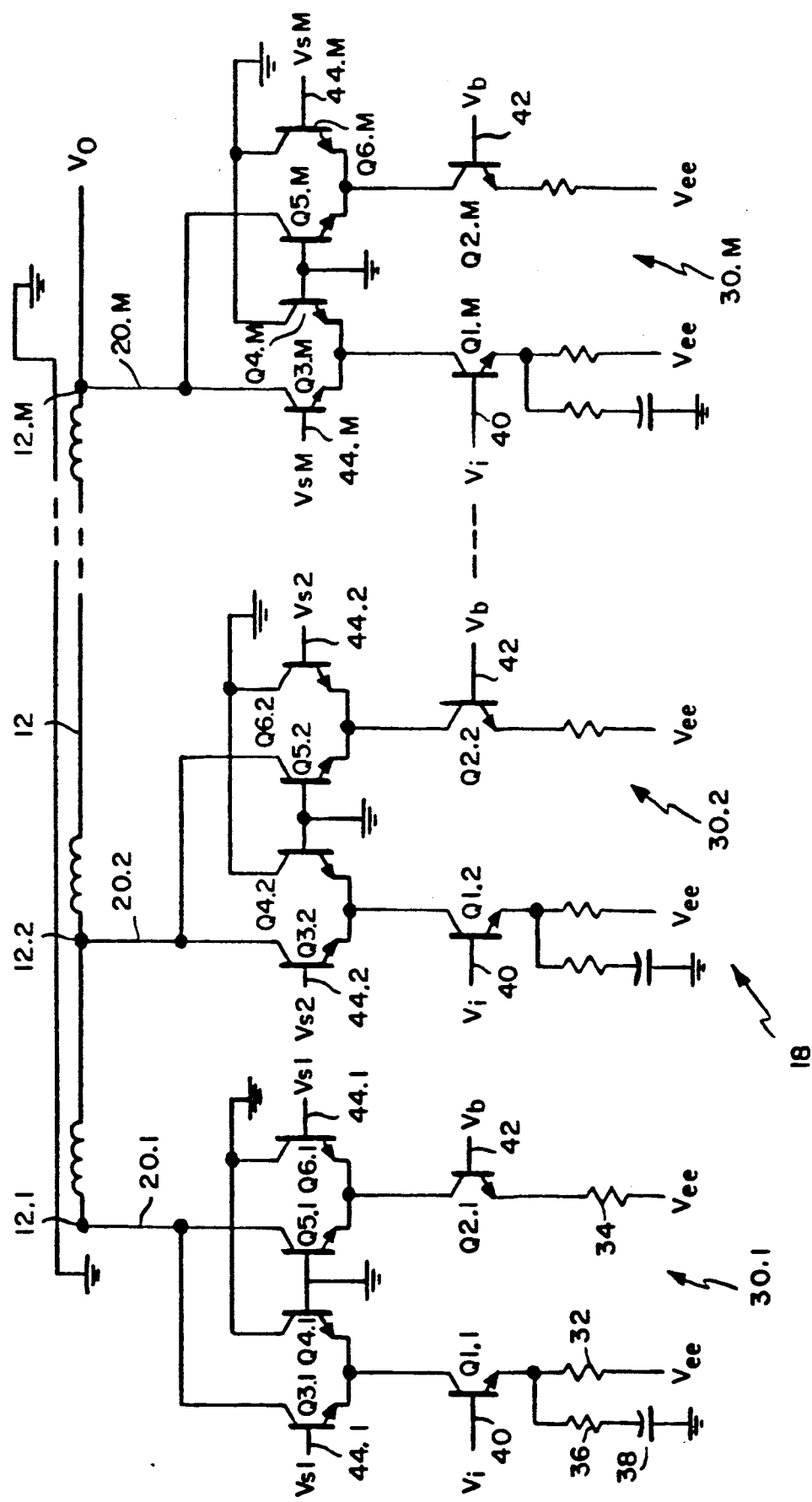
FIG. 2 is a circuit diagram of a switching array for a first embodiment of the invention.

FIG. 2 shows a single switching array 18 for a first illustrative embodiment of the invention. Assuming the array has outputs to all taps in delay line 12, switching array 18 is formed of M individual switching circuits 30.1, 30.2 ... 30.M. Switching circuit 30.1 has a first transistor Q1.1 and a second transistor Q2.1, both of which have their emitters connected through like resistors 32 and 34 to a potential source $V_{ee}$ (for example −10 V). The emitter of transistor Q1.1 is also connected through a resistor 36 and a capacitor 38 to ground. The base of transistor Q1.1 is connected by a line 40 to the corresponding output from switch 19. Transistor Q2.1 has its base connected through a line 42 to a DC source $V_b$ which is substantially identical to the DC level of the AC signal on line 40. A typical value for $V_b$ might be −2 V. Thus, transistors Q1.1 and Q2.1 serve as identical current sources.

As will be illustrated for later embodiments, the signal on line 40, rather then being applied as a voltage input to the base of transistor Q1, could be applied as a current input either through resistor 36 and capacitor 38 or directly to the emitter of transistor Q1 with resistor 36 and capacitors 38 being eliminated.

The collector of transistor Q1.1 is connected to the emitters of transistors Q3.1 and Q4.1 while the collector of transistor Q2.1 is connected to the emitters of transistors Q5.1 and Q6.1. The bases of transistors Q3.1 and Q6.1 are connected to a line 44.1 which is one of the lines 24 to which a switching signal for switching circuit 30.1 is applied by processor 22 (FIG. 1). The switching voltage levels on a line 44 may, for example, be slightly above and slightly below ground (i.e., $V_{s(ion)} = +0.25$ V and $V_{s(off)} = -0.25$ V). The bases of transistors Q4.1 and Q5.1 are connected together to ground. The collectors of transistors Q4.1 and Q6.1 are also connected together to ground, or some higher bias voltage Vcc (for example +10 V) as the circuit may require, while the collectors of transistors Q3.1 and Q5.1 are connected together as the output line 20.1 from the circuit leading to delay line tap 12.1.

Circuits 30.2–30.M are identical to circuit 30.1, except that the input line 44 to the Q3 and Q6 transistor of each such switch circuit is a separate switch line from processor 22 which has a signal on it independent of the other switch lines 44. For a preferred embodiment, a switching signal would appear on only one of the lines 44 for a switching array 18 at any given time, although this is not a limitation on the invention.

In operation, the gain of each switch circuit 30 is to a first order determined by the ratio of the impedance at the corresponding delay line tap and the impedance of the series combination of resistor 36 and capacitor 38. When the signal on line 44.1 is positive with respect to ground, transistors Q3.1 and Q6.1 are conducting and transistors Q4.1 and Q5.1 are cut off. Thus, current flowing through transistor Q1.1 has superimposed on it the output from switch 19 (FIG. 1) and is applied through transistor Q3.1 to tap 12.1 on delay line 12. The DC current flowing through transistor Q2.1 which was connected to tap 12.1 is shunted to ground through transistor Q6.1. Usually only one switch circuit 30 in switch array 18 would be on at a time. The remaining switches would be off by having signal on the line 44 for such switch circuit be negative with respect to ground.

Assume, for example, that the on signal appears on switch line 44.2. This would result in a transition occurring for this switch circuit, with transistors Q4.2 and Q5.2 being turned off and transistors Q3.2 and Q6.2 being turned on. This results in the DC current flowing through transistor Q1.2, which DC current has the AC current representative of the signal on line 40 superimposed thereon, being applied through transistor Q3.2 and line 20.2 to tap 12.2 on the delay line, and in the current which was previously being applied from transistor Q2.2 to this tap being shunted to ground through transistor Q6.2. However, since the DC currents from transistors Q1.2 and Q2.2 are substantially identical, and since the AC current superimposed on the DC current has a zero average value, this results in no change in the average DC current level at tap 12.2, and thus results in substantially no switching transients as a result of the switching which occurs at this tap.

Similarly, when the signal on line 44.2 terminates, transistors Q3.2 and Q6.2 are cut off and transistors Q4.2 and Q5.2 become conducting. This returns switch circuit 30.2 to its initial condition with the superimposed current of Q1.2 being shunted to ground through transistor Q4.2 and the DC current from transistor Q2.2 being applied through transistor Q5.2 and line 20.2 to tap 12.2. However, for the reasons previously discussed, this also results in no change in the DC current level at the tap and thus in substantially no switching transients. The remaining switch circuits 30 in switching array 18 would operate in a similar manner to apply the signal on line 40 to the tap associated with such switching circuit and would also result in subtantially no switching transients occurring at the tap.

Figure 3:
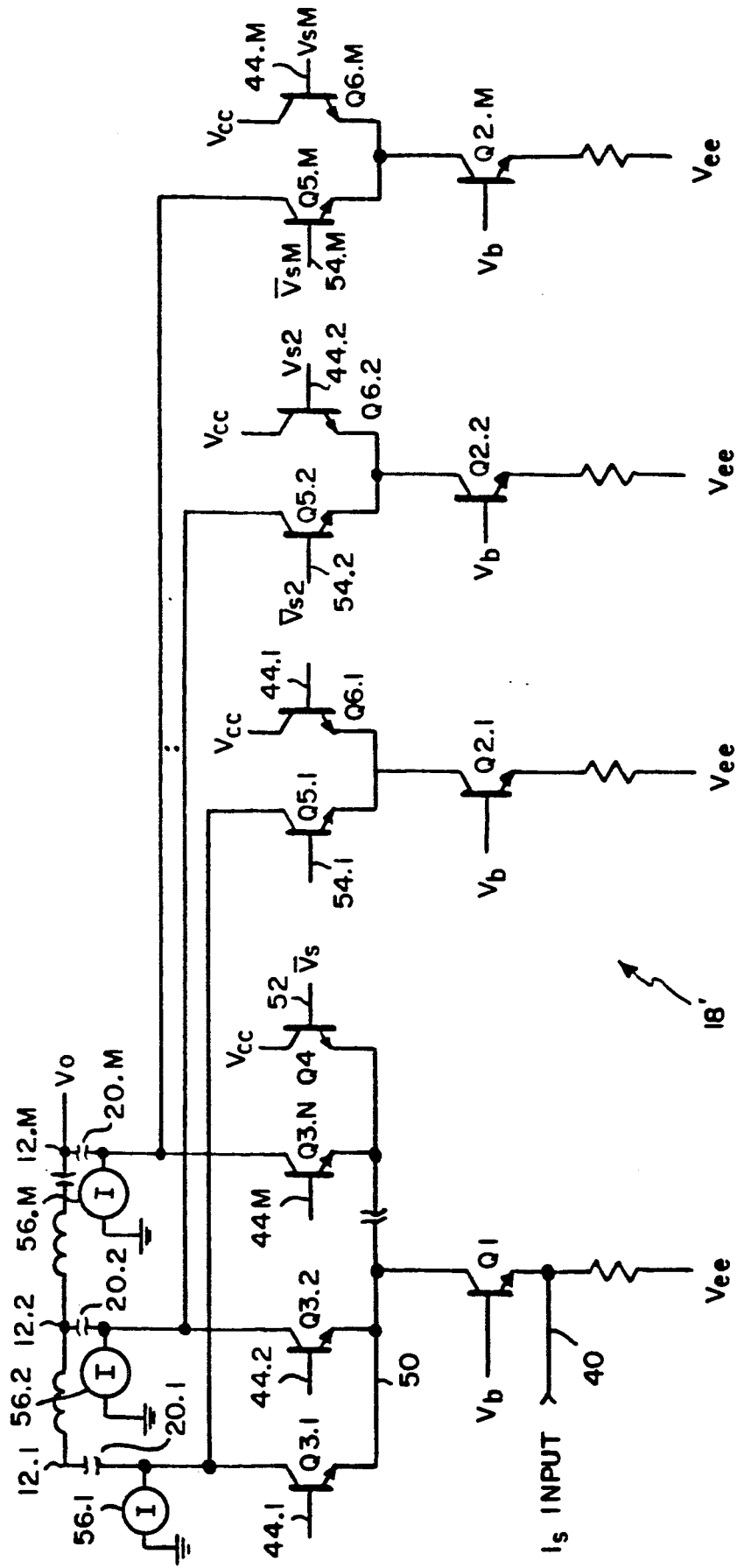
FIG. 3 is a circuit diagram of a switching array for a second embodiment of the invention.

FIG. 3 shows a switching array 18' which functions in a manner substantially the same as for the circuit 18 shown in FIG. 2, but is generally a preferred circuit in that it requires fewer transistors to perform the switching function. More particularly, a single transistor Q1 generates a constant DC current with an AC current representative of the signal appearing on line 40 superimposed thereon on a common line 50. For this embodiment, line 40 provides an AC current input at the emitter of transistor Q1. The Q3 transistor for each switching circuit has its emitter connected to common line 50. The base of transistor Q4 may be connected to ground as in FIG. 2, but is preferably connected to receive a $\overline{V}_s$ (i.e. inverted) level switch signal on line 52 if a signal does not appear on any line 44.

There is, however, still a separate Q2 transistor for each stage. The only differences for this portion of the circuit are that the collector of the Q6 transistor of each switch circuit is connected to Vcc rather then ground and the base of the transistors Q5 and Q6 are connected to lines 54 and 44, respectively. The signal on the line 54 attached to the base of each Q5 transistor is the inverted version of the switching signal applied to the corresponding line 44. Thus, a signal appears on line 54.1 and its complement on line 44.1, a signal appears on line 54.2 and its complement on line 44.2, etc. The signals on lines 54 may be obtained from processor 22 or by inverting the signals on lines 44 at the switching arrays 18. The collectors of the Q3 and Q5 transistors for each switch circuit 30 are connected through the corresponding line 20 to the corresponding tap on delay line 12.

An additional difference for the circuit of FIG. 3 is that, instead of a current source 21 for each tap 12.1–12.M as in FIG. 1, a current source 56.1–56.M is provided for each switch circuit 30.1–30.M, respectively, of the array. The DC current of each source 56 is substantially equal to the constant DC current at the output of the corresponding switch circuit and is applied with a polarity such that the resulting DC current at the output of each switch circuit is substantially zero. Current sources 56 thus provide the same advantages as the current sources 21, but accomplish it on a switching circuit by switching circuit basis rather than at each tap. If delay line 12 is constructed such that its delay values are independent of DC current, current sources 56 would not be required.

In operation, signals initially appear on all lines 54, meaning that switching signals do not appear on any line 44. This results in transistor Q4 being turned on to shunt the DC current having an AC current superimposed thereon from transistor Q1 (i.e. all switch circuits off). The constant DC current from current sources Q2 is applied through the enabled Q5 transistor of each switch circuit to the corresponding delay line tap as for the prior embodiment.

When a signal is applied to line 40, this signal would normally be applied to only one tap on delay line 12. Therefore, a signal will only appear on one switch line 44, meaning that all but one of the switching circuits will remain in the state described above with the Q5 transistor conducting. Assume, for example, that a signal appears on line 44.2. This results in transistor Q3.2 being conductive and transistor Q4 being cut off, the signal on line 52.2 no longer being present. Transistor Q5.2 is therefore cut off, the signal on line 54.2 to its base going low when a signal appears or goes high on line 44.2, resulting in transistor Q6.2 conducting to shunt the DC current from transistor Q2.2 to $V_{cc}$. The DC current from transistor Q1 with an AC current proportional to the signal on line 40 superimposed thereon is thus applied through transistor Q3.2 to tap 12.2 on delay line 12 in lieu of the DC current from transistor Q2.2 previously appearing at this tap. However, as previously discussed, this results in no change in the DC current at the tap and thus in no switching transients. For reasons which have been previously discussed, the return of switch circuit 30.2' to its initial state or the switching of any other switch circuit in switching array 18' similarly results in a substantially transient free switching operation. Current sources 56 balance or counteract the constant DC currents so that a substantially zero DC current is applied to the summing line 20 (FIG. 1) from each circuit.

The array of FIG. 3 thus performs the same function as the array of FIG. 2, utilizing one less switching transistor and one less current source for each stage except the first stage. This results in a substantial savings in transistors and power dissipation in the array. These savings are possible because only one of the circuits 30 in an array 18 is passing an output at any given time so that only one "on" mode current source (Q1) is required. However, since all stages can be in an off mode, a separate "off" mode current source (Q2) is still required for each stage.

Figure 4:
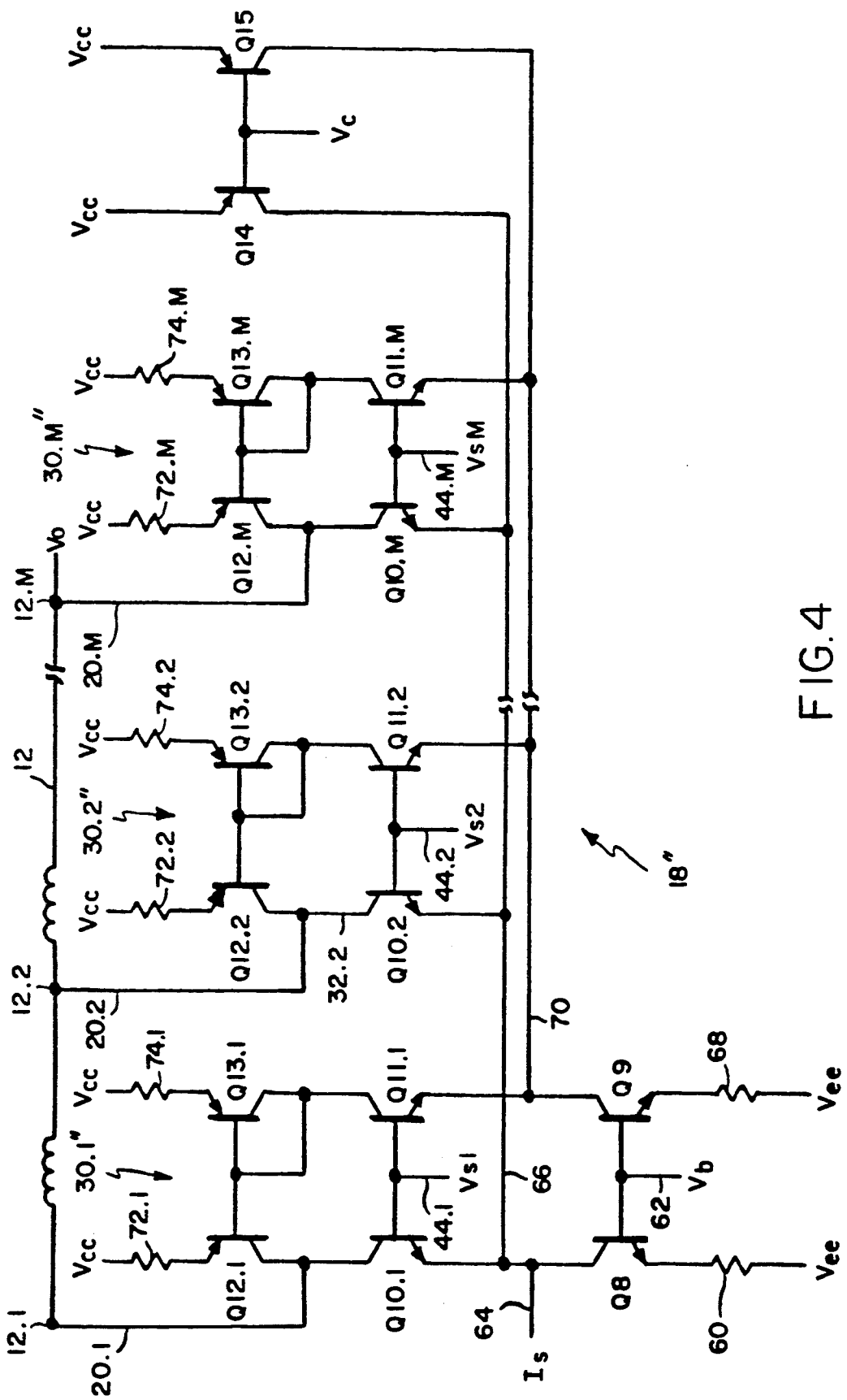
FIG. 4 is a circuit diagram of a switching array for a third embodiment of the invention.

FIG. 4 shows a switching array 18" for another embodiment of the invention which achieves the same objective as the earlier embodiments, including zero DC current to the summing line 20, but in a somewhat different way. Thus, where the embodiment of FIG. 4 is utilized for the arrays 18, current sources 21 (FIG. 1) would not be utilized. For this embodiment of the invention, a transistor Q8 having its emitter connected through a resistor 60 to a source of potential $V_{ee}$ and its base connected through a line 62 to a source of potential $V_b$ generates a first predetermined DC current which is applied to common line 66. An AC signal current from, for example, window switch 19 appearing on line 64 is added to the DC current applied to common line 66. Transistor Q9 having its emitter connected through a resistor 68 to potential source $V_{ee}$ and its base connected through line 62 to source $V_b$ generates a DC current which is the same as the DC current from transistor Q8, which current appears on common line 70. Each stage has a switching transistor Q10, the emitter of which is connected to common line 66 and a switching transistor Q11, the emitter of which is connected to line 70. The bases of the transistors Q10 and Q11 for each switching circuit are connected to the line 44 carrying the switching signal for that switching circuit. The collector of the transistor Q10 for each switching circuit is connected through the corresponding line 20 to the corresponding tap on delay line 12 for the switching circuit.

A pair of current mirroring transistors Q12 and Q13 is also provided for each switching circuit. The emitters of transistors Q12 and Q13 for each stage are connected through corresponding resistors 72 and 74, respectively, to potential source Vcc. The collector of transistor Q12 for each circuit is also connected to line 20 for the circuit. The collectors of transistors Q11 and Q13 for each stage are connected together and to the bases of transistors Q12 and Q13.

Lines 66 and 70 are also connected to the emitter of transistors Q14 and Q15. The collectors of both these transistors are connected to potential Vcc and the bases of both transistors are connected to potential $V_c$. Transistors Q14 and Q15 are needed to sink the current from transistors Q8 and Q9 respectively when all switching signals 44 are off. Bias voltage $V_c$ is at substantially the mid point of the switching signal on lines 44. All other potentials could also be as previously indicated with $V_b$ being slightly negative (i.e. $-2$ V).

In operation, with a low switching signal appearing on all of the lines 44, transistors Q10 and Q11 for all stages are cut off and transistors Q14 and Q15 are on. This blocks current from current source Q8 from being applied through transistor Q10 to output line 20 and also blocks current from transistor Q9 from being applied to transistor Q13. This results in transistor Q13 also being cut off, and, since transistors Q12 and Q13 are connected as a current mirror, transistor Q13 being cut off also results in transistor Q12 being cut off. Therefore, no current from transistor Q12 is being applied to any line 20. Thus, under these circumstances, zero DC current appears on the output line 20 for each switch circuit 30".

When a high switch signal appears, for example, on line 44.2, this causes transistors Q10.2 and Q11.2 to become conducting. This results in the signal current and D.C. current on line 66 being applied to line 32.2. At the same time, the DC current appearing on line 70 is passed through transistor Q11.2 to the base of transistors Q12.2 and Q13.2 and the collector of transistor Q13.2. This renders these transistors conducting, causing transistor Q12.2 to apply a DC current which is equal to the DC current applied to line 32.2 from line 66. This results in a net zero DC current being applied to line 20.2, all of the current from transistor Q12.2 appearing on line 32.2. Since there is a net zero DC current applied to this line when the circuit is in either its on or off state, for reasons previously discussed, this results in substantially no switching transients, and also results in no DC currents flowing in the delay line.

When the signal on line 44.2 terminates, circuit 30.2" returns to its initial condition with no currents being applied to line 20.2. Again, since there is no change in the DC current applied to this line, no switching transients, and thus no artifacts, result at the output. The remaining switch circuits of array 18" operate in the same manner described above for switch circuit 30.2".

The circuit shown in FIG. 4 is advantageous in that it results in zero net DC currents being applied to the delay line taps under all conditions, only requires two precision current source transistors Q8, Q9 and results in very low power consumption. However, the circuit is disadvantageous in that it involves fairly precise matching of the currents being applied through transistors Q10 and Q12 of each stage to line 20 of the stage which requires careful design of the circuit.

Switching arrays have thus been provided utilizing low transient switch circuits which permit high speed switching of taps in an ultrasonic scanning system utilizing a delay line architecture which employs dynamic focusing of the scanning beam. While three different embodiments of the circuit have been shown, it is apparent that additional modifications could be made in the various circuits while still remaining within the scope of the invention. For example, while each switching array in FIGS. 2-4 is shown as having M stages, corresponding to the M delay line taps, as previously indicated, there may be a lesser number of switch circuits in the switching arrays where each transducer element need not be connectable to each delay line tap. Further, Darington transistors, field effect transistors, diodes, or other known switching elements may be substituted for some or all of the transistors in certain embodiments. Current mirroring schemes other then that shown in FIG. 4 might also be utilized. The various embodiments for providing zero current may also be utilized somewhat interchangeably with various array embodiments.

Thus, while the invention has been particularly shown and described above with reference to preferred embodiments, the foregoing and other changes in form and detail may be made therein by one skilled in the art without departing from the spirit and scope of the invention.

What is claimed is:

1. A low transient apparatus for focusing an ultrasonic transducer scanning system having a scanning window with a predetermined number of transducer channels by selectively controlling delay line taps to which channel transducer output signals are applied comprising:
   a switching array for each transducer channel in the window, the output from the transducer for each transducer channel in the window being applied to the corresponding switching array, each of said arrays having an output for each of at least selected taps on said delay line, a switch circuit for each array output, each of which switch circuits provides a substantially constant DC current output regardless of the state of the circuit, and means connecting each circuit to a corresponding array output;
   means for each delay line tap for summing the output from each array corresponding to the delay line tap and for applying the summed outputs as the input to the tap; and
   means for controlling the state of each switch circuit of each array to apply an input to the switch array to a selected array output.

2. Apparatus as claimed in claim 1 wherein each of said switch circuits may be in an on state or an off state, wherein when a switch circuit is in its off state, it provides a predetermined DC current to the corresponding array output, and wherein when the switch circuit is in its on state, it provides said predetermined DC current to the corresponding array output with an AC signal representative of the input for the array channel superimposed thereon, whereby switching transients at the array outputs are minimized.

3. Apparatus as claimed in claim 2 wherein the DC current at the array outputs is substantially zero.

4. Apparatus as claimed in claim 3 including first and second substantially like DC current sources, wherein when a switch circuit is in the off state, neither DC current source is connected to the switch circuit output, and wherein when the switch circuit is in its on state, the like DC currents appear at the switch circuit output, whereby there is substantially zero DC current at the switch circuit output for both states.

5. Apparatus as claimed in claim 2 including first and second substantially like DC current sources; means for superimposing on one of the DC currents an AC current representative of the array input signal, and wherein each switch circuit includes means for applying said one current, having AC current superimposed thereon to the switch circuit output when the circuit is in its on state, and means for applying the other DC current to the output when the circuit is in its off state.

6. Apparatus as claimed in claim 5 wherein there is a single source for the one DC current having the AC current superimposed thereon for all switch circuits of a given switch array.

7. Apparatus as claimed in claim 5 wherein there is a separate source for the one DC current having AC current superimposed source for the other DC current for each switch circuit of a given switch array.

8. Apparatus as claimed in claim 5 wherein each switch circuit has at least first and second transistors; and including means for selectively providing a separate switching signal to each switch circuit, the first transistor being enabled when the switching signal is of a first value and the second transistor being enabled when the switching signal is of a second value, means for applying the one DC with superimposed AC current to the circuit output through an enabled first transistor, and means for applying the other DC current to the circuit output thrugh an enabled second transistor.

9. Apparatus as claimed in claim 8 including means for shunting the one DC current with superimposed AC current when no first transistor to which it is applied is enabled.

10. Apparatus as claimed in claim 9 including means for shunting the other DC current when no second transistor to which it is applied is enabled.

11. Apparatus as claimed in claim 5 wherein only one of the switch circuits in each switch array may be in its on state at any given time.

12. Apparatus as claimed in claim 1 including means for causing the DC current of the summed outputs applied to each tap to be substantially equal.

13. Apparatus as claimed in claim 12 wherein the DC current of the summed outputs applied to each tap is substantially zero.

14. Apparatus as claimed in claim 13 wherein the substantially constant DC current output from each switch circuit is substantially zero.

15. Apparatus as claimed in claim 13 wherein each of said switch circuits has a substantially constant DC current output $I_{dc}$; and including a means for each switch circuit for generating a current equal to the $I_{dc}$ for the switch circuit, and means for applying each generated current to the output of the corresponding switch circuit in a direction opposite to that of the DC current output, whereby the net DC current at each switch circuit output is substantially zero.

16. Apparatus as claimed in claim 13 wherein each of said switch circuits has a substantially constant DC current output, the DC current at the input to each tap being the sum of the DC currents at the outputs from the corresponding switch circuits, and including a means for each tap for generating a DC current equal to the summed DC currents at the tap input, and means for applying each generated DC current to the input to the corresponding tap in a direction opposite to that of the summed currents, whereby the net DC current at the tap is substantially zero.

17. A low transient switching array for applying an AC input signal to one of a plurality of array outputs comprising:

a switch circuit for each array output, each switch circuit having a first and a second state; and wherein each switch circuit includes means for applying a first DC current to the array output for the switch circuit when the switch circuit is in its first state, and means for applying the DC current with an AC current representative of the input signal superimposed thereon to the array output when the switch circuit is in the second state, said first and second DC currents being substantially the same.

18. A switching array as claimed in claim 17 wherein the DC current at the array outputs is substantially zero.

19. A switching array as claimed in claim 18 including first and second substantially like DC current sources, wherein when a switch circuit is in one state, neither DC current source is connected to the switch circuit output, and wherein when the switch circuit is in its second state, the like DC currents appear at the switch circuit output, one of said DC currents having the AC current superimposed thereon, whereby there is substantially zero DC current at the switch circuit output for both states.

20. A switching array as claimed in claim 17 including first and second substantially like DC current sources; means for superimposing an AC current representative of the array input signal on one of the DC currents, and wherein each switch circuit includes means for applying one DC current having superimposed AC current to its output when the circuit is in its first state, and means for applying the other DC current to its output when the circuit is in its second state.

21. A switching array as claimed in claim 20 wherein there is a single current source for the one DC current with superimposed AC current for all switch circuits of the switch array.

22. A switching array as claimed in claim 20 wherein there is a separate current source for the one current with superimposed AC current and a separate current source for the other DC current for each switch circuit of the switch array.

23. A switching array as claimed in claim 20 wherein each switch circuit has at least first and second transistors; and including means for selectively providing a separate switching signal to each switch circuit, the first transistor being enabled when the switching signal is of a first value and the second transistor being enabled when the switching signal is of a second value, means for applying the one DC current having superimposed AC current to the circuit output through an enabled first transistor, and means for applying the other DC current to the circuit output through an enabled second transistor.

24. A switching array as claimed in claim 23 including means for shunting the one DC current having superimposed AC current when no first transistor to which it is applied is enabled.

25. A switching array as claimed in claim 24 including means for shunting the other DC current when no second transistor to which it is applied is enabled.

26. A switching array as claimed in claim 20 wherein only one of the switch circuits in the switch array may be in its on state at any given time.

27. A low transient switching circuit for selectively applying an AC input signal to the circuit output comprising:

first and second DC current sources, which current sources are substantially alike;

means for superimposing an AC current representative of the input signal on the DC current from one of said sources; and means for applying a switch signal having at least two values to the circuit;

means for applying the one DC current having superimposed AC current to the output in response to the switch signal being of a first value; and means for applying the DC current from the other current source to the output in response to the switch signal being of a second value;

whereby a substantially constant DC current is applied to the circuit output.

28. A switching circuit as claimed in claim 27 including a first and a second transistor, the first transistor being enabled when the switching signal is of the first value and the second transistor being enabled when the switching signal is of the second value, means for applying the one DC current having superimposed AC current to the circuit output through an enabled first transistor, and means for applying the other DC current to the circuit output through an enabled second transistor.

* * * * *